(12) United States Patent
Noh

(10) Patent No.: US 6,973,326 B2
(45) Date of Patent: Dec. 6, 2005

(54) ENHANCED CLOSED-LOOP POWER CONTROL METHOD

(75) Inventor: Suk Hoon Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 10/140,814

(22) Filed: May 9, 2002

(65) Prior Publication Data
US 2002/0173331 A1 Nov. 21, 2002

(30) Foreign Application Priority Data
May 19, 2001 (KR) ............................... 2001-27493

(51) Int. Cl.[7] .............................................. H04B 7/00
(52) U.S. Cl. ................ 455/522; 455/127.1; 455/127.5; 455/504
(58) Field of Search ............................ 455/522, 127.1, 455/127.5, 504

(56) References Cited

U.S. PATENT DOCUMENTS

| | | | |
|---|---|---|---|
| 6,061,339 A | 5/2000 | Nieczyporowicz et al. | |
| 6,070,086 A | 5/2000 | Dobrica | |
| 6,163,708 A | 12/2000 | Groe | |
| 6,175,744 B1 | 1/2001 | Esmailzadeh et al. | |
| 6,185,431 B1 | 2/2001 | Li et al. | |
| 6,292,471 B1 | 9/2001 | Cao et al. | |
| 6,317,587 B1 | 11/2001 | Tiedemann, Jr. et al. | |
| 6,377,555 B1 | 4/2002 | Lee et al. | |
| 6,389,296 B1 * | 5/2002 | Shiraki et al. | 455/522 |
| 6,615,051 B2 * | 9/2003 | Saarela | 455/522 |
| 6,792,248 B1 * | 9/2004 | Naghian | 455/69 |
| 6,804,531 B2 * | 10/2004 | Komatsu | 455/522 |
| 6,879,814 B2 * | 4/2005 | Kaikati et al. | 455/127.1 |

FOREIGN PATENT DOCUMENTS

WO   WO 00/45528   8/2000

* cited by examiner

Primary Examiner—Rafael Perez-Gutierrez
Assistant Examiner—Michael Chu
(74) Attorney, Agent, or Firm—Fleshner & Kim, LLP

(57) ABSTRACT

An enhanced closed-loop power control method includes the steps of: setting an initial value of a power control variable; detecting a strength of a terminal signal and comparing the detected strength with a reference Eb/No; transmitting a power control signal to a terminal according to the comparison result and the set power control variable value; and analyzing the power control signal transmitted to the terminal for a predetermined reference time period and resetting a power control variable. When the subscriber does not move in an area with a favorable radio reception sensitivity (that is, in a state that the Eb/No is a little changed) the base station sets the power control step-size lower than the current step-size and performs a fine power control. Thus, a flux of the transmission power can be prevented. And, since the number of puncturings performed per unit time is reduced, the data transmission efficiency can be heightened.

13 Claims, 5 Drawing Sheets

α:PUNCTUALING PERIOD
β:POWER CONTROL STEP-SIZE

α: PUNCTUALING PERIOD
β: POWER CONTROL STEP-SIZE

ENHANCED CLOSED-LOOP POWER CONTROL METHOD

BACKGROUND OF THE INVENTION

1. Field of the Invention

The present invention relates to a power control of a wireless communication, and more particularly, to a closed-loop power control method in a CDMA.

2. Description of the Background Art

In case of a wired communication, a signal of a subscriber is transmitted and received through an independent transmission path. Unlikely, in case of a wireless communication such as a CDMA, several subscribers transmit signals in the same frequency band by the medium of the air, so that signals of terminals reaching a base station affect each other.

Among the signals reaching the base station, if transmission power of a specific terminal is higher than a reference value, the signal of the specific terminal interferes a signal of a different terminal. Meanwhile, if the transmission power of a specific terminal is lower than the reference value, the base station fails to recognize the signal of the corresponding terminal. Thus, a power control mechanism is requisite for the wireless communication, and especially, for the CDMA.

A power control method includes an opened-loop power control method and a closed-loop power control method.

The opened-loop power control method is that a terminal measures a transmission power of a base station and compares the measured transmission power of the base station with a reference transmission power to determine its own transmission power. In this method, the terminal performs a dependent power control with respect to the base station.

Meanwhile, the closed-loop power control method is that a base station measures a transmission power of a terminal and controls a transmission power of the terminal. In this method, the terminal performs a passive power control under the control of the base station.

In the closed-loop power control of the CDMA (code division multiple access), the base station periodically measures an energy bit/noise (Eb/No) in order to maintain a suitable frame error rate (FER).

The Eb/No is a strength of a signal received from a terminal, and if a measured Eb/No is lower than a reference Eb/No, the base station transmits a power level up-adjusting signal to the terminal. If, however, the measure Eb/No is higher than the reference Eb/No, the base station transmits a power level down-adjusting signal. The Eb/No is also expressed by an Energy bit/interference (Eb/Io).

FIG. 1 is a flow chart of a closed-loop power control method in accordance with a conventional art.

As shown in FIG. 1, the closed-loop power control method includes the steps of: setting an initial value of a power control variable (step S1); measuring an Eb/No of a received terminal signal (step S2); comparing the measured Eb/No with a reference Eb/No (step S3), instructing a terminal to adjust down a transmission power, if the measured Eb/No is higher than the reference Eb/No (step S4), and instructing the terminal to adjust up the transmission power, if the measured Eb/No is lower than the reference Eb/No (step S5).

The closed-loop power control process will now be described in detail.

In the initial value setting step (step S1), the base station sets a reference Eb/No and a power control step-size. While the terminal is being connected to the base station, the base station periodically (1.25 ms in case of IS-95) measures an Eb/No of the terminal (step S2). The measured Eb/No is compared with the reference Eb/No (step S3). The base station transmits a transmission power control signal according to the comparison result to the terminal through a traffic channel or a control channel.

In the step S3, if the measured Eb/No is lower than the reference Eb/No, a power control bit '0' is transmitted from the base station to the terminal so that the transmission power level of the terminal is up-adjusted (step S5). If, however, the measured Eb/No is higher than the reference Eb/No, a power control bit '1' is transmitted and the transmission power level of the terminal is down-adjusted (step S4).

FIG. 2 is a conceptual diagram of transmission of the power control signal between the terminal and the base station, in which a power control signal of a base station is transmitted through a traffic channel or a control channel.

Especially, in case of the traffic channel, a data stream is grouped by every 1.25 ms and 1 bit power control signal is inserted into each data group and transmitted. Accordingly, the base station transmits 800 power control signals per second.

The data group is called a power control group, and the inserted power control signal is called a 'power control bit'. Periodically transmitting to the terminal by inserting the power control signal into the data group is referred to as 'puncturing'.

As shown in FIG. 2, a position of the power control signal in each power control group is not fixed. The position of the power control signal may be determined by the base station and the terminal.

In this manner, in order for the transmission power of the terminal to be maintained at a suitable level, the base station repeatedly performs the steps (S2~S5) by 800 times per second. And, the base station selects one of 1 dBm, 0.4 dBm, 0.25 dBm and sets it as a power control step-size. The power control step-size set in the initializing step (step S1) can not be changed. The measured period of the Eb/No and the power control signal transmission period are the same with each other.

As mentioned above, as for the conventional closed-loop power control method, when a subscriber does not move in a certain area where a radio reception sensitivity is constant (that is, a state with a small change in the Eb/No) and even when the subscriber is located in an area where the radio reception sensitivity is rapidly changing or when the subscriber is moving at a high speed, the same power control signal transmission period (1.25 ms in the IS-95) and the same step-size are applied.

As a result, in the former case that the subscriber does not move, since the terminal inserts an unnecessary power control signal into the data group, a transmission efficiency is degraded, and an up/down of a power level is unnecessarily repeated, causing a flux of the transmission power.

In the latter case that the subscriber is moving at a high speed, the base station can not properly cope with the Eb/No of the terminal signal that is rapidly changing.

FIG. 3 is a graph showing the power control period and the step size for the Eb/No, revealing the problem of the conventional power control method as described above.

As shown in FIG. 3, in the conventional power control method, the same power control signal transmission period and step-size are applied to a situation ($t_0$–$t_1$) in which the Eb/No is rapidly increasing and a situation ($t_1$–$t_2$) in which the Eb/No is constantly maintained. That is, the power control signal transmission period and step-size set as an arbitrary terminal is connected are not re-set while the connection with the corresponding terminal is maintained.

Therefore, the base station fails to quickly cope with the rapid change ($t_0$–$t_1$), and unnecessarily repeats up and down of the power level in the situation ($t_1$–$t_2$) in which the Eb/No is constantly maintained.

Thus, the conventional power control method has disadvantages that it is not able to quickly cope with the situation ($t_0$–$t_1$) in which the Eb/No is rapidly changing) and an efficiency is degraded in the situation ($t_1$–$t_2$) in which the Eb/No is constantly maintained.

The above references are incorporated by reference herein where appropriate for appropriate teachings of additional or alternative details, features and/or technical background.

SUMMARY OF THE INVENTION

Therefore, an object of the present invention is to provide an enhanced closed-loop power control method that is capable of re-setting a power control signal transmission period and a power control step-size according to a change in an energy bit/noise (Eb/No).

To achieve at least the above objects in whole or in parts, there is provided an enhanced closed-loop power control method including the steps of: setting an initial value of a power control variable (step S10); detecting a strength of a terminal signal and comparing the detected strength with a reference Eb/No (steps S11~S13); transmitting a power control signal to a terminal according to the comparison result and the set power control variable value (step S14); and analyzing the power control signal transmitted to the terminal for a predetermined reference time period and re-setting a power control variable (step S15).

In the enhanced closed-loop power control method of the present invention, the terminal signal strength detecting step includes the steps of: periodically measuring an Eb/No of the terminal signal (step S11) and calculating an average of the measured Eb/No when it reaches a time point of transmission of the power control signal (step S12).

In the enhanced closed-loop power control method of the present invention, the power control variable re-setting step (S15) comprising the steps of: increasing a power control step-size and decreasing a transmission period of the power control signal, if the number of times of continuous transmission of the same power control signal is above the maximum number of times of continuous transmission; decreasing a power control step-size and increasing a transmission period of the power control signal, if the number of times of continuous transmission of the same power control signal is below the minimum number of times of continuous transmission; and not re-setting the power control variables (the power control step-size and the power control signal transmission period), if the number of times of continuous transmission of the same power control signal is between the maximum number of times of continuous transmission and the minimum number of times of continuous transmission.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
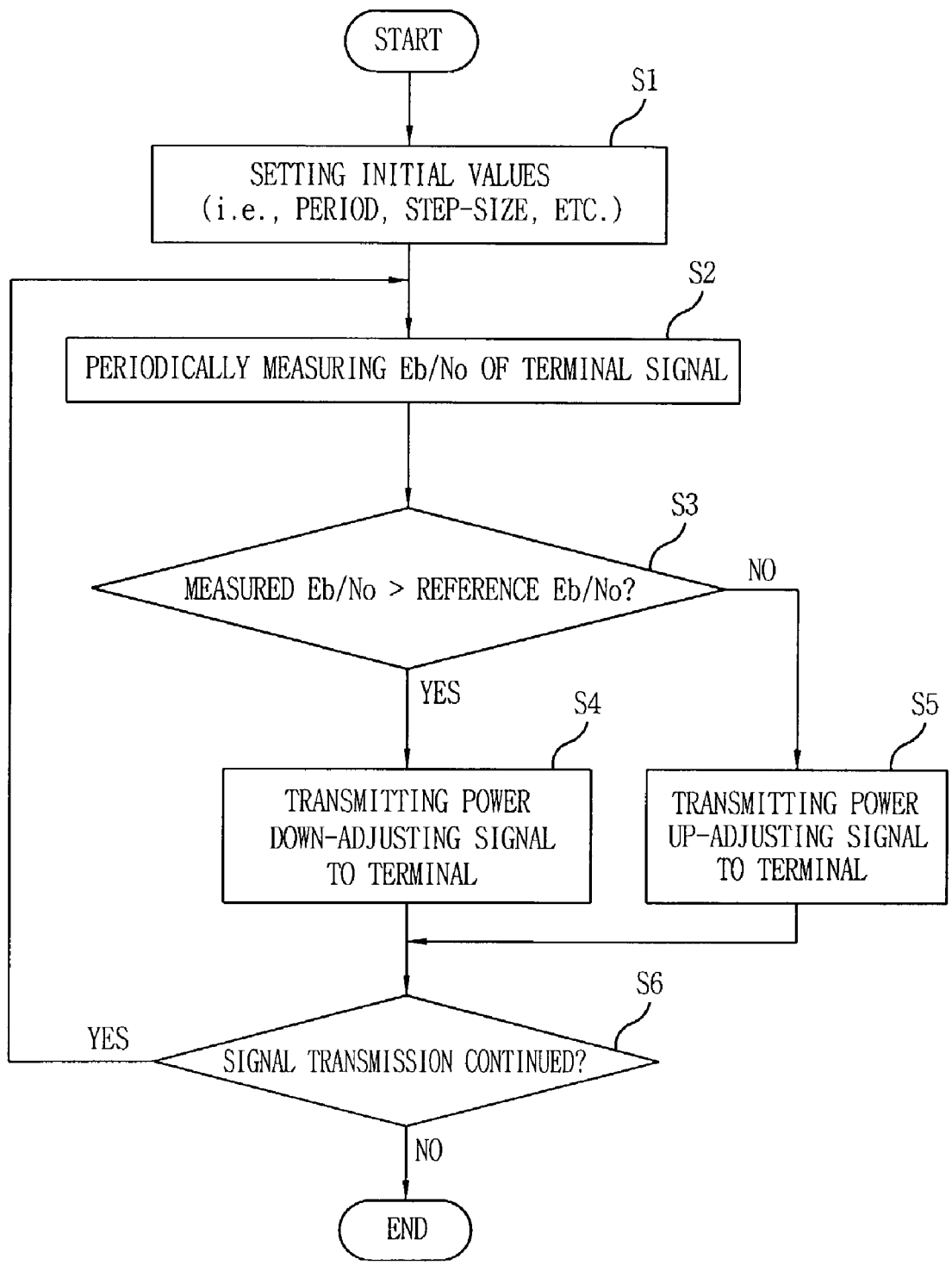
FIG. 1 is a flow chart of a closed-loop power control method in accordance with a conventional art.
Figure 2:
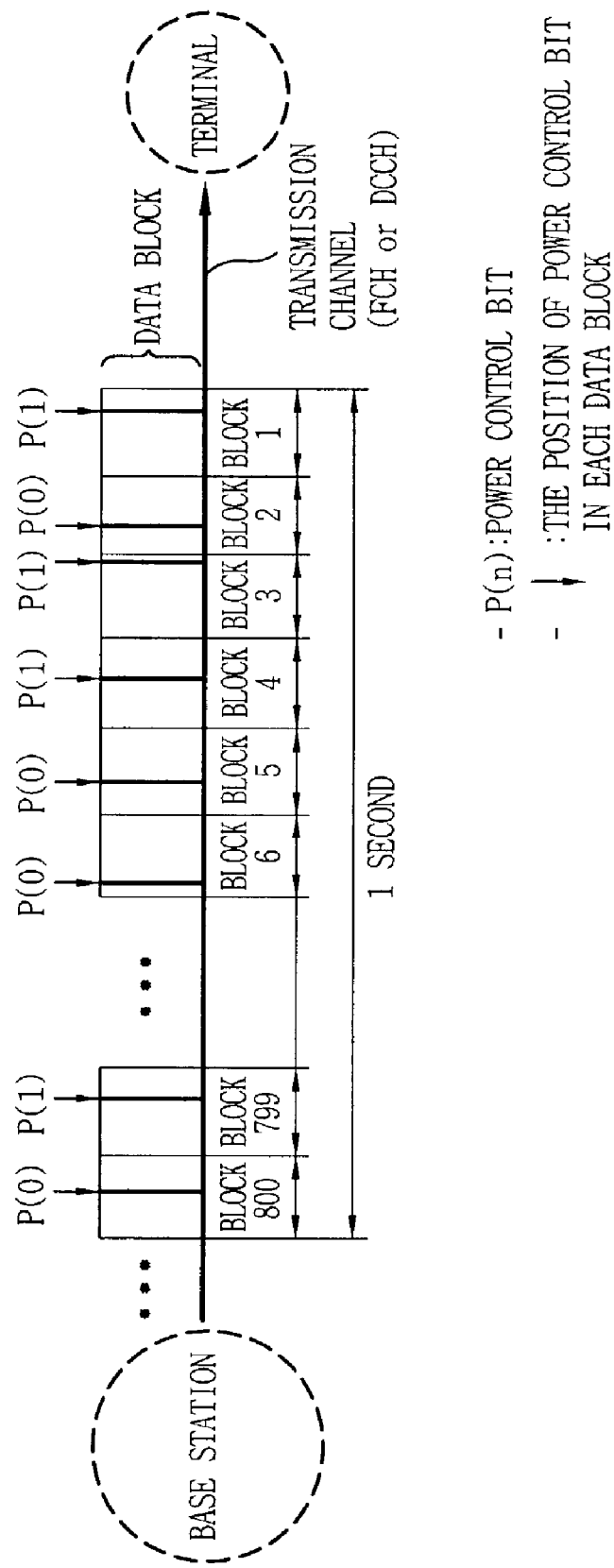
FIG. 2 is a conceptual diagram of transmission of a power control signal between a terminal and a base station.
Figure 3:
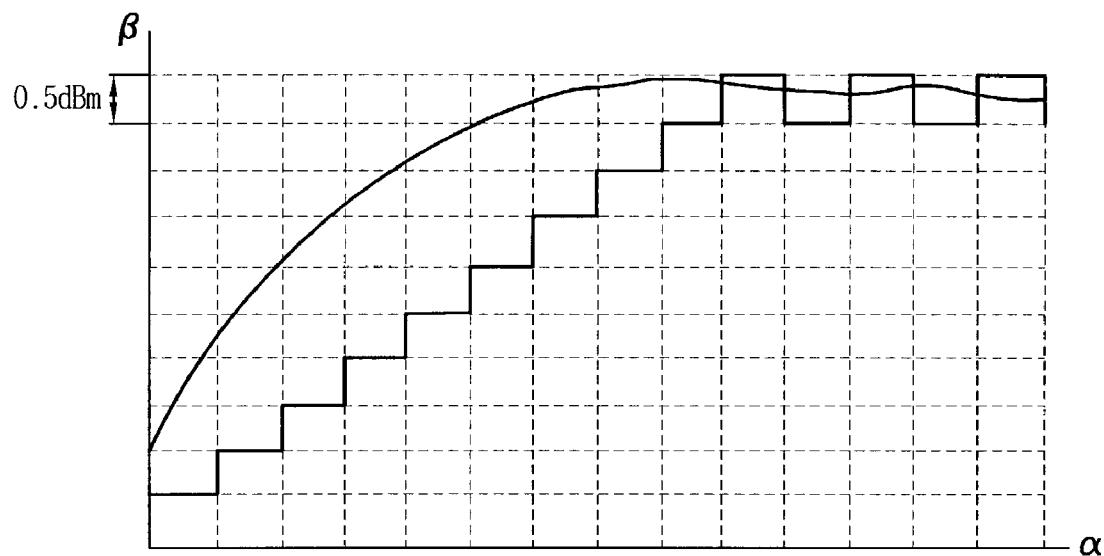
FIG. 3 is a graph showing a power control period and a step-size of an Eb/No.
Figure 4:
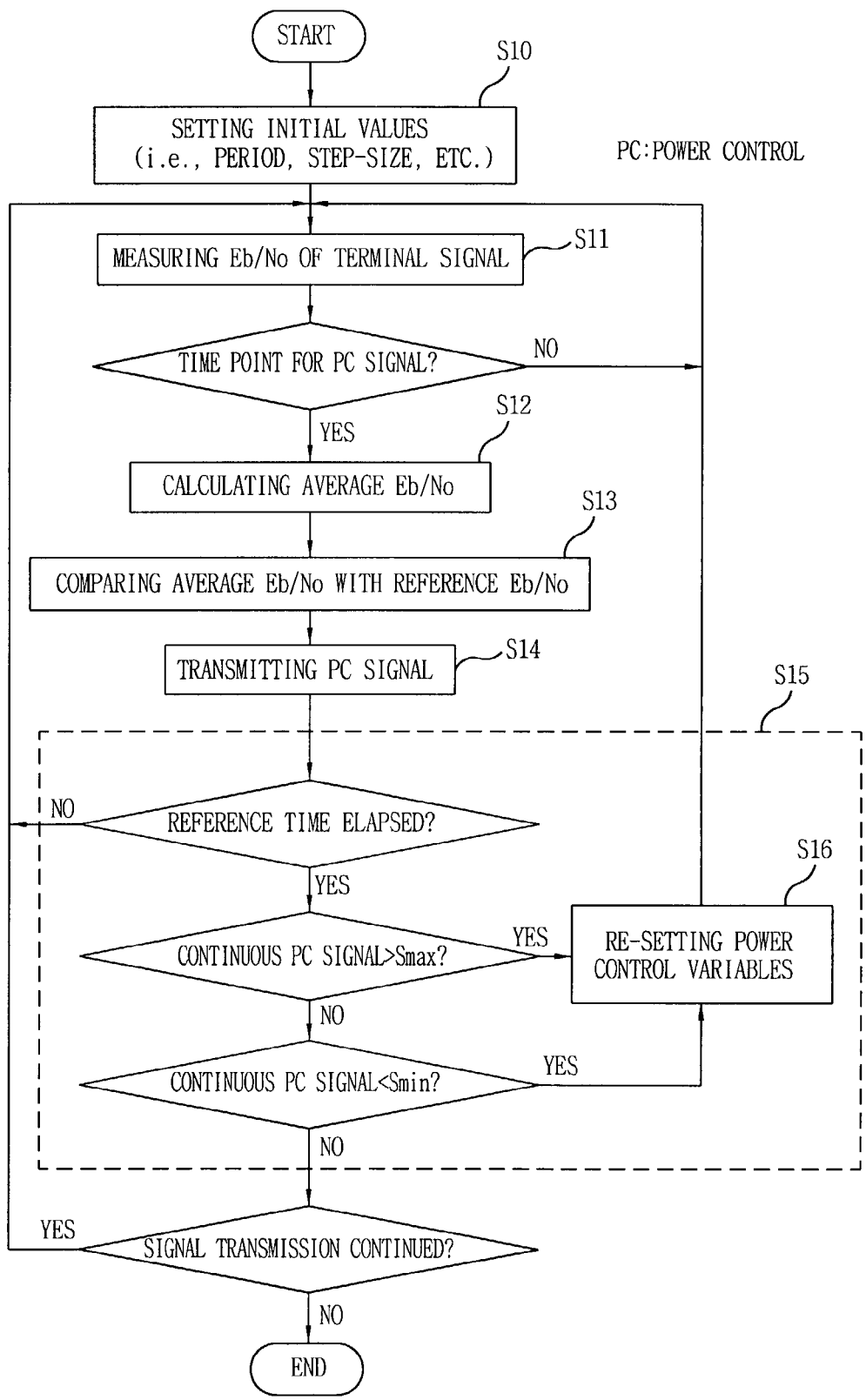
FIG. 4 is a flow chart of an enhanced closed-loop power control method in accordance with a preferred embodiment of the present invention.

FIG. 4 is a flow chart of an enhanced closed-loop power control method in accordance with a preferred embodiment of the present invention.

As shown in FIG. 4, an enhanced closed-loop power control method of the present invention include the steps of: setting an initial value of a power control variable (step S10); detecting a strength of a terminal signal and comparing the detected strength with a reference Eb/No (steps S11~S13); transmitting the power control signal according to the comparison result and the set power control variable value; and analyzing the power control signal transmitted to the terminal for a certain reference time period and re-setting a power control variable (step S15).

The terminal signal strength detecting step includes the steps of: periodically measuring an Eb/No of the terminal signal (step S11) and calculating an average of the measured Eb/No when it reaches a time point of transmission of the power control signal (step S12).

The power control variable re-setting step (S15) comprising the steps of: increasing a power control step-size and decreasing a transmission period of the power control signal, if the number of times of continuous transmission of the same power control signal is above the maximum number of times of continuous transmission; decreasing a power control step-size and increasing a transmission period of the power control signal, if the number of times of continuous transmission of the same power control signal is below the minimum number of times of continuous transmission; and not re-setting the power control variables (the power control step-size and the power control signal transmission period, the maximum and minimum number of times of continuous transmission, and a reference time), if the number of times of continuous transmission of the same power control signal is between the maximum number of times of continuous transmission and the minimum number of times of continuous transmission.

Figure 5:
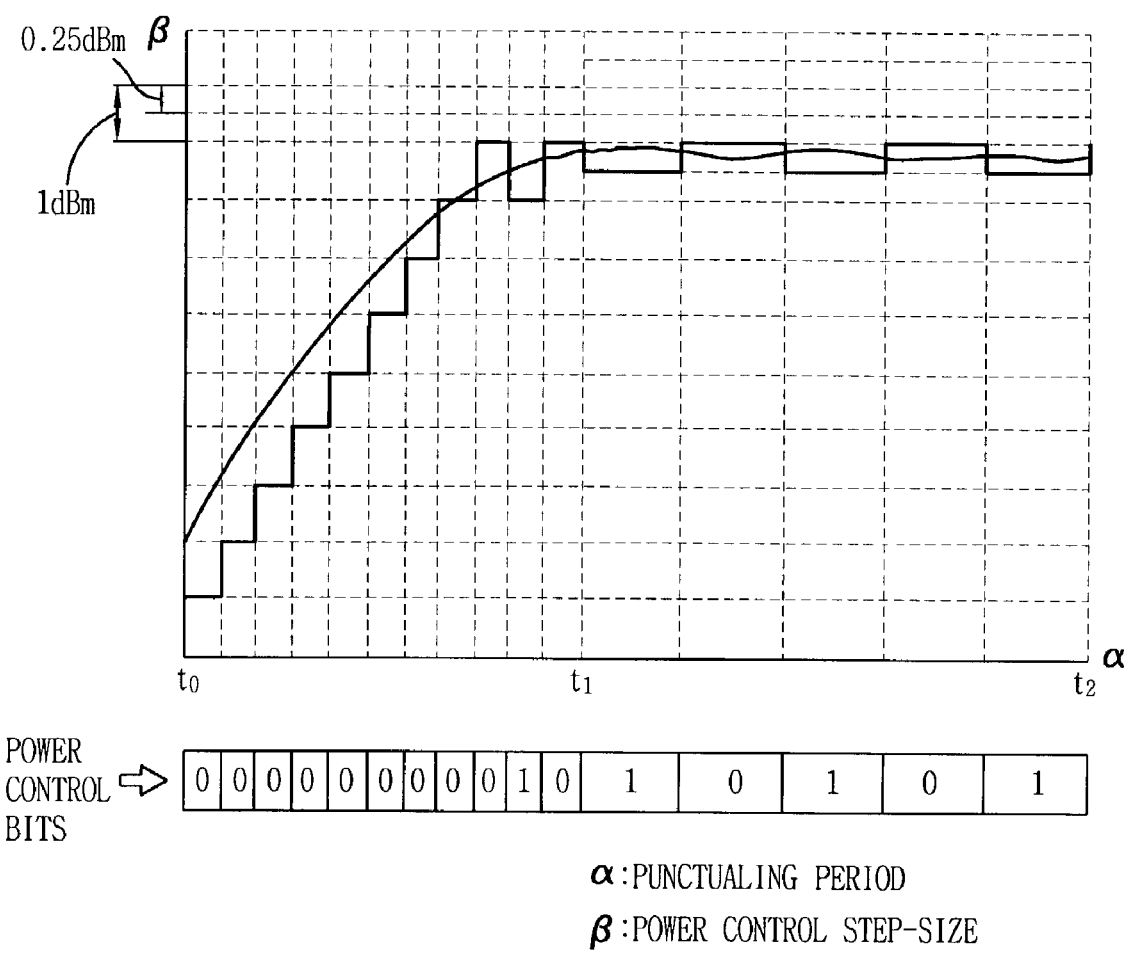
FIG. 5 is a graph showing a power control period and a step-size in accordance with the preferred embodiment of the present invention.

FIG. 5 is a graph showing a power control period and a step-size in accordance with the preferred embodiment of the present invention.

The enhanced closed-loop power control method in accordance with the present invention will now be described in detail with reference to FIGS. 4 and 5.

In the step of initializing a system, the base station sets an Eb/No measurement period, a reference Eb/No, a power control signal transmission period (puncturing period), a reference time, an initial power control step-size and the maximum number of times ($S_{max}$) and the minimum number of times ($S_{min}$) for continuous transmission of a power control signal (step S10).

Referring back to the conventional method, when the base station measures the Eb/No, the measured Eb/No is compared with a reference Eb/No and a power control signal ('0' or '1') is transmitted according to the comparison result.

Comparatively, in the enhanced closed-loop power control method of present invention, however, the Eb/No measurement period and the power control signal transmission period are separately set. That is, the base station periodically measures the Eb/No until it reaches a transmission time point of the power control signal (step S11), and then, when it reaches the transmission time point of power control signal, the base station calculates an average Eb/No (steps S12) and compares the average Eb/No with the reference Eb/No (step S13). And then, according to the comparison result, the base station transmits a corresponding power control signal ('0' or '1') (step S14). In this respect, the Eb/No measurement period is smaller than or the same as the puncturing period.

In the step S13, if the average Eb/No is greater than the reference Eb/No, the base station transmits a power level down-adjusting signal ('1'). If, however, the average Eb/No is smaller than the reference Eb/No, the base station transmits a power level up-adjusting signal ('0').

After transmitting the power control signal, the base station checks whether each reference time has elapsed. If the reference time has not been elapsed, the steps S11~S14 are repeatedly performed.

Meanwhile, if the reference time has elapsed, the base station checks the power control signal transmitted during the reference time and re-sets the power control step-size and the puncturing period (step S16).

If the same power control signal is continuously transmitted for the reference time and the number of times of continuous transmission exceeds the maximum number of times ($S_{max}$), the base station sets the power control step-size higher than the current step-size and sets the time interval of the puncturing (the puncturing period) narrower. That the same power control signal is continuously transmitted signifies that the Eb/No of the terminal signal is rapidly increased or decreased.

However, as the power up-adjusting signal ('0') and the power down-adjusting signal ('1') are alternately transmitted (i.e., '0100101 . . . . ') and the number of times of continuous transmission of the same power control signal is smaller than the minimum number of times ($S_{min}$), the base station sets the power control step-size lower than the current step-size and sets the time interval of the puncturing (the puncturing period) even longer.

If the number of times of continuous transmission of the same power control signal ('1' or '0') transmitted for the reference time is between the maximum number of times ($S_{max}$) and the minimum number of times ($S_{min}$), the base station repeatedly performs the power control operation without re-setting the power control variables (the power control step-size and the puncturing period).

In the above operation, when the power control step and the puncturing period are re-set (step S16), the maximum number of times ($S_{max}$) and the minimum number of times ($S_{min}$) of the number of times of continuous transmission of the power control signal, and the reference time are re-set suitable to the re-set value.

As so far described, the enhanced closed-loop power control method of the present invention, in which the power control signal transmission period (the puncturing period) and the power control step-size are variably assigned in consideration of the temporal variation amount of the Eb/No, has the following advantages.

That is, for example, when the subscriber does not move in an area with a favorable radio reception sensitivity (that is, in a state that the Eb/No is a little changed) the base station sets the power control step-size lower than the current step-size and more precisely performs a power control. Thus, a flux of the transmission power can be prevented. And, since the number of puncturings performed per unit time is reduced, the data transmission efficiency can be heightened.

In addition, in case that the subscriber is in an area where a radio reception sensitivity is much changing or the subscriber is moving at a high speed (that is, in a state that the Eb/No is rapidly increasing or decreasing), the base station increases the number of puncturings and sets the power control step-size higher than current step-size to quickly cope with the change of the Eb/No. Thus, the reception sensitivity can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A closed-loop power control method comprising:
    setting an initial value of a power control variable;
    detecting a strength of a terminal signal and comparing the detected strength with a reference signal strength;
    transmitting a power control signal to a terminal according to the comparison result and the set power control variable value; and
    analyzing the power control signal transmitted to the terminal for a predetermined reference time period and re-setting the power control variable,
    wherein re-setting the power control variable comprises:
    increasing a power control step-size and decreasing a transmission period of the power control signal, if a number of times of continuous transmission of the same power control signal is above a maximum number of times of continuous transmission;
    decreasing a power control step-size and increasing a transmission period of the power control signal, if the number of times of continuous transmission of the same power control signal is below a minimum number of times of continuous transmission; and
    not re-setting the power control step-size and the power control signal transmission period, if the number of times of continuous transmission of the same power control signal is between the maximum number of time.

2. The method of claim 1, wherein detecting the strength of the terminal signal comprises:
    periodically measuring a strength of the terminal signal; and
    calculating an average of the measured signal strength when it reaches a time point of transmission of the power control signal.

3. The method of claim 1, wherein the power control variable includes:
    a reference signal strength;
    a reference time;
    a terminal signal measurement period;
    a power control step-size;

a transmission period of a power control signal;
the maximum number of times of continuous transmission of the power control signal; and
the minimum number of times of continuous transmission of the power control signal 4. The method of claim 1, wherein the re-set power control variable includes:
a power control step-size;
a transmission period of a power control signal;
the maximum number of times of continuous transmission and the minimum number of times of continuous transmission of the power control signal; and
a reference time.

5. The method of claim 2, wherein the terminal signal measurement period is set to be smaller than or the same as the transmission period of the power control signal.

6. The method of claim 1, wherein the power control method is performed in a code division multiple access mode of communication system.

7. A closed-loop power control method comprising:
setting an initial value of a power control variable;
periodically measuring a strength of a terminal signal;
calculating an average of the measured signal strength when it reaches a transmission time point of a power control signal;
comparing the average signal strength with a reference signal strength;
transmitting the power control signal to a terminal according to the comparison result and the set power control variable value; and
analyzing the power control signal transmitted to the terminal for a certain reference time and re-setting the power control variable to include a power control signal transmission period and a power control step size different from the initial value of the power control variable.

8. The method of claim 7, wherein the power control variable includes:
a reference signal strength;
a reference time;
a terminal signal measurement period;
a power control step-size;
a transmission period of a power control signal;
the maximum number of times of continuous transmission of the power control signal; and
the minimum number of times of continuous transmission of the power control signal 9. The method of claim 7, wherein the re-set power control variable includes:
a power control step-size;
a transmission period of a power control signal;
the maximum number of times of continuous transmission and the minimum number of times of continuous transmission of the power control signal; and
a reference time.

10. The method of claim 8, wherein the terminal signal measurement period is set to be smaller than or the same as the transmission period of the power control signal.

11. The method of claim 7, wherein if the average signal strength is greater than the reference signal strength, the base station transmits a power down-adjusting signal to the terminal, while if the average signal strength is smaller than the reference signal strength, the base station transmits a power up-adjusting signal to the terminal.

12. The method of claim 7, wherein setting the power control variable re-setting comprises:
increasing a power control step-size and decreasing a transmission period of the power control signal, if the number of times of continuous transmission of the same power control signal is above the maximum number of times of continuous transmission;
decreasing a power control step-size and increasing a transmission period of the power control signal, if the number of times of continuous transmission of the same power control signal is below the minimum number of times of continuous transmission; and
not performing the power control variable re-setting step, if the number of times of continuous transmission of the same power control signal is between the maximum number of times of continuous transmission and the minimum number of times of continuous transmission.

13. The method of claim 7, wherein the power control operation is performed in a code division multiple access (CDMA) mode of communication system.

* * * * *